Aug. 23, 1960 R. NEUSCHOTZ 2,949,800
TOOL FOR INSTALLING THREADED ELEMENTS
Filed May 11, 1959
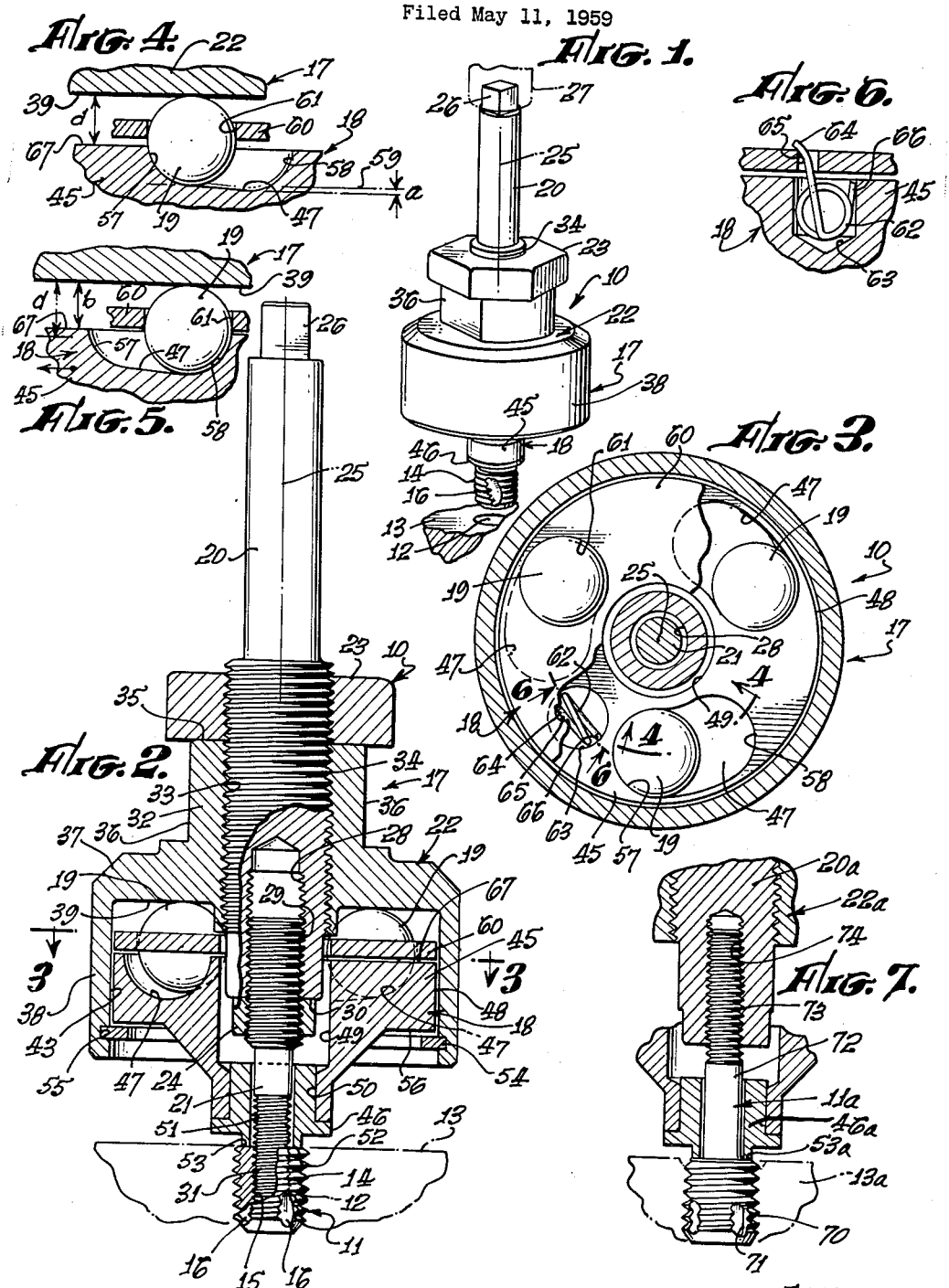
INVENTOR.
ROBERT NEUSCHOTZ,
By William P. Green
ATTORNEY.

United States Patent Office 2,949,800
Patented Aug. 23, 1960

2,949,800

TOOL FOR INSTALLING THREADED ELEMENTS

Robert Neuschotz, 1162 Angelo Drive,
Beverly Hills, Calif.

Filed May 11, 1959, Ser. No. 812,222

11 Claims. (Cl. 81—53)

This invention relates to an improved type of tool for screwing a threaded element, such as a threaded insert or stud, into a bore formed in an associated carrier part. As will appear, a tool embodying the invention is in certain respects particularly effective for installing threaded elements of the self-tapping type, or elements having a tight friction fit or "interference fit" with the mating part. However, it will be apparent that the tool may also be applied to the installation of various other types of threaded elements if desired.

The most difficult problem encountered in designing a tool for installing a self-tapping threaded element, or an element having an interference fit, is the problem of assuring effective disengagement of the tool from the threaded element after the element has been fully screwed into position. In order to screw such an element into an initially unthreaded bore, the applying tool must of course exert very substantial forces against the element, which forces tend to tighten the usual threaded connection between the tool and element to a condition in which it may be difficult to unscrew or detach the tool from the threaded element without at the same time unscrewing the element from the carrier part.

The general object of the present invention is to provide a tool of this general type, which is especially designed to facilitate very easy and rapid disconnection of the tool from the threaded element after the element has been screwed into a bore. The tool is actuated by merely turning the tool first in one rotary direction, to screw the threaded element into the bore, and then reversing the direction of rotation to unscrew the tool from the element. The initial portion of this unscrewing movement acts automatically and very reliably to actuate the tool to a predetermined released condition, in which the very tight gripping force exerted by the tool on the element is very quickly released, to prevent any tendency for unscrewing of the element with the tool. A tool constructed in accordance with the invention accomplishes this releasing action in a much more effective manner than has been possible with prior tools intended for the same purpose, and does so with a structure which is considerably simpler and easier to manufacture than previously proposed expedients, and which is also more rugged in operation and capable of withstanding very extended use over a long period of time without damage to the tool.

A tool embodying the invention includes two relatively rotatably movable sections, a first of which includes or is operatively connected to a member which is adapted to be threadedly connected to the element being installed. The second of the two sections is designed to exert an axially inward force against the threaded element during an applying operation. Axial forces are transmitted from the first section to the second by means of a plurality of circularly spaced rolling members, preferably taking the form of a series of balls interposed between the two sections. Each of these rolling members engages and is adapted to roll along two opposed surfaces on the two sections respectively. One of these surfaces is disposed at an inclination such that, when the rolling member moves along that surface, the inclination of the surface allows the second mentioned of the two sections to retract axially a short distance relative to the first mentioned section, to thereby release the tool from the threaded element. The inclined surface is so designed that the retracting movement of the second section is effected as a result of and during the initial unscrewing movement of the other section. Each of the balls or other rolling members may be movably received within a short arcuate groove formed in the engaged surface of one of the two sections, with these arcuate grooves being themselves inclined to serve as the discussed inclined surfaces, and to effect the discussed axial camming action of the two sections.

The rolling members may be located and controlled by means of a retainer structure, typically taking the form of an apertured retainer plate positioned axially between the two sections. This retainer plate is desirably yieldingly urged circularly to a predetermined position relative to one of the two sections, in a manner such that the retractable one of the two sections is held by the rolling members against retracting or releasing movement while a threaded element is being screwed into position by the tool, and until the initial unscrewing movement of the driver section causes the rolling members to be displaced in a releasing direction.

The above and other features and objects of the present invention will be better understood from the following detailed description of the typical embodiments illustrated in the accompanying drawing in which:

Fig. 1 is perspective view of an insert applying tool constructed in accordance with the invention;

Fig. 2 is an enlarged axial section through the Fig. 1 tool;

Fig. 3 is a transverse section, partially broken away, taken on line 3—3 of Fig. 2;

Fig. 4 is a fragmentary section taken on the arcuate line designated 4—4 in Fig. 3;

Fig. 5 is a view similar to Fig. 4, but showing the ball in its released position;

Fig. 6 is an enlarged fragmentary section taken on the arcuate line designated 6—6 in Fig. 3; and Fig. 7 is a fragmentary view similar to Fig. 2, but showing a variational form of the invention.

With reference first to Figs. 1 through 6, and particularly Figs. 1 and 2, I have shown at 10 a tool embodying the invention, and which is designed for screwing a threaded element 11 into a bore 12 in a carrier part 13. The element 11 is typically represented in the drawing as a self-tapping threaded insert, in which case the bore 12 in part 13 is an initially unthreaded bore. Insert 11 has external threads 14 for threadedly engaging the interior of bore 12, and has internal threads 15, into which an associated stud or bolt is to be connected after the insert has been installed in part 13. To render the external threads 14 of insert 11 self-tapping, the insert has a plurality of circularly spaced recesses 16 near its axially inner end, which recesses interrupt the threads 14 of the insert in a manner such that the threads form sharp cutting edges acting to tap internal threads in the initially unthreaded cylindrical bore as the insert 11 is screwed into that bore. Such self-tapping threaded inserts are of course well known in the art.

The tool 10 includes a first section generally designated at 17, a second section designated 18, and a plurality of evenly circularly spaced balls 19 for transmitting forces from section 17 to section 18. Section 17 in turn includes a main driver shank 20, an insert holding shank 21, a body element 22, and two jam nuts 23 and 24 for retaining the various parts of section 17 in rigidly fixed positions relative to one another. All of these parts are centered about the main axis 25 of the tool, and are adapted to be turned about that axis in order to screw the insert 11 into bore 12. Main shank 20 is elongated in the direction of axis 25, and has an upper portion 26 of non-circular cross-section, typically square, to be gripped by a chuck portion 27 (see Fig. 1) of a power tool which functions to turn shank 20 about axis 25. As chuck 27 turns about axis 25 in a right hand direction, the chuck advances axially (downwardly as viewed in Figs. 1 and 2) at a rate corresponding to the rate of advancement or lead of the external threads 14 of insert 11, to assure proper screwing of the insert into part 13. When the chuck 27 turns shank 20 in a left hand or unscrewing direction, the chuck retracts axially at a rate corresponding to the lead of internal threads 15 in the insert, to unscrew the tool from those internal threads.

At its axially inner end, part 20 contains an internally threaded passage 28, into which an externally threaded portion 29 of shank 21 is removably connected, with the jam nut 24 being received about portion 29 of shank 21 and being tightenable against the end surface 30 of part 20 to tightly and rigidly secure part 21 in fixed position relative to part 20. The axially or downwardly projecting portion 31 of shank 21 has external threads of a pitch and diameter corresponding to internal threads 15 within insert 11, so that portion 31 of shank 21 can be screwed into the insert as shown.

Body part 22 is annular, and of the cross-section illustrated clearly in Fig. 2. This part 22 may be considered as having a tubular hub portion 32, which is disposed about part 20, and contains internal threads 33, engaging external threads 34 formed on part 20. Jam nut 23 also engages external threads 34 of part 20, and is tightenable axially against part 22 at 35, to rigidly lock part 22 in any desired adjusted position relative to part 20. The hub portion 32 of part 22 may have external flats as shown at 36 in Fig. 1, for engagement by a wrench during adjustment of part 22 relative to part 20, or during the tightening of jam nut 23 against part 22.

The hub portion 32 of part 22 carries a radially outwardly projecting annular flange 37, from whose outer edge there projects an axially extending rim or flange portion 38 of part 22. Preferably, both the external and internal surfaces of portion 38 of the part 22 are of straight cylindrical configuration, as shown. At its axially inner side, the radially projecting flange portion 37 of part 22 has an annular surface 39, which is engaged by the balls 19, and which may extend directly transversely of axis 25.

Section 18 of the tool is mounted for rotation relative to section 17 about axis 25, and is typically formed of two rigidly interconnected parts 45 and 46. Part 45 may be exactly annular, except at the location of a plurality of evenly circularly spaced grooves 47 for partially receiving balls 19 (typically three grooves and three balls). The radially outer surface 48 of part 45 may be cylindrical, and of a diameter to fit closely but rotatably within axially projecting rim portion 38 of part 22. Internally, part 45 has an axially extending passage 49, through which parts 20 and 21 project, with annular end bearing piece 46 being a tight pressed fit within an end portion 50 of passage 49. The inner bore 51 in part 46 may be cylindrical, and of a diameter slightly greater than the external diameter of the contained portion of part 21. At its end, part 46 has an annular transverse surface 52, which is adapted to bear axially against the transverse end surface 53 of insert 11, to limit the extent to which the insert can be screwed onto threaded portion 31 of shank 21. This threaded portion 31 of the shank 31 projects far enough beyond end surface 52 of part 46 to effectively hold the insert on shank 21, with the shank 21 preferably extending substantially entirely through the entire axial length of the insert. Part 45 and its carried element 46 are retained against axial separation from body part 22 and the associated elements by means of a resilient retainer ring 54, which is snapped into groove 55 in part 22, and is engageable by a transverse surface 56 of part 45 to limit its axial movement away from part 22.

As will be understood by reference to Figs. 3 to 5, the three grooves 47 extend arcuately about axis 25, and are dimensioned to effectively confine and locate the three balls 19 while still allowing these balls to roll along the grooves. In transverse section as seen in Fig. 2, the grooves 47 have a semi-circular sectional configuration corresponding to that of the balls, to prevent movement of the balls radially with respect to axis 25. Also, each groove has at its opposite ends a pair of spherically curved end walls 57 and 58, conforming to the spherical configuration of the coacting ball, and engageable with the ball to limit the arcuate rolling movement of the ball along the groove.

In order to allow for an automatic retracting action of section 18 relative to section 17 upon unscrewing rotation of the latter, the grooves 47 are disposed at a slight inclination relative to the directly transverse surface 39 which is engaged by the opposite sides of balls 19. That is, as the grooves advance circularly about axis 25, each groove also advances slightly in an axial direction, to function as a camming surface for controlling the relative axial positioning of sections 17 and 18. This axial advancement or inclination of the grooves is brought out clearly in Figs. 4 and 5, in which it is apparent that the groove is disposed at an angle "a" with respect to a plane 59 disposed directly transversely of axis 25. This angle a is a very small angle, preferably between about two and four degrees, and for best results about three degrees. The direction of advancement of grooves 47 is such that these grooves advance progressively away from the insert carrying end of the tool (upwardly as seen in Fig. 2) as the grooves advance circularly in a right hand screwing direction.

Interposed axially between part 45 and the radially projecting flange portion 37 of part 22, there is provided an annular rigid retainer disc 60, which may extend directly radially as shown, and which contains three evenly spaced circular apertures 61 within which balls 19 are confined. These apertures 61 are of a diameter only slightly larger than the contained balls, so that the rotary positioning of retainer 60 relative to part 45 determines the positioning of balls 19 within grooves 47. Retainer 60 is normally yieldingly urged in a right hand direction relative to part 45 by means of a spring 62 which is received within a recess 63 (see Fig. 6) in part 45, and which has an arm 64 projecting into an opening 65 in retainer 60. One end 66 of spring 62 bears against a side wall of recess 63 in a left hand rotary direction, while the opposite end 64 of the coil spring bears against retainer 60 in a right hand direction. This spring thus urges retainer 60 to a position in which all of the three balls 19 are maintained in the positions represented in Fig. 4 relative to their respective grooves 47. The spring yieldingly resists movement of the retainer to the position of Fig. 5, in which the balls are received in the deepest ends of grooves 47.

In using the tool represented in Figs. 1 through 6, the shank 20 is first connected into chuck 27, and work piece 13 is positioned beneath or opposite the tool in the position shown. An insert such as that represented at 11 is then screwed onto the projecting threaded shank 31 of the tool, and to a position in which the insert abuts against end surface 52 of part 46. Chuck 27 is then power actuated to turn shank 20 and the rest of the tool in a right hand direction, to screw insert 11 into bore 12, with the insert functioning to tap threads into the wall of that bore as the insert is advanced into the bore. During this right hand turning movement of the parts and the insert, balls 19 are received in the shallow ends of grooves 47, as shown in Fig. 4. When the balls are located in this Fig. 4 position, the balls act to maintain a predetermined maximum spacing "d" between surface 39 on part 22 and a surface 67 on part 45. Parts 45, 46 and 60, and balls 19, all turn with section 17 during the right hand insert installing rotation of section 17, by virtue of the frictional engagement of part 46 with the insert, and the frictional engagement of balls 19 with surface 39.

After the insert has been fully screwed into its Fig. 2 position within part 13, chuck 27 is actuated to turn shank 20 in a left hand unscrewing direction. The initial left hand rotation of shank 20 and the associated parts causes balls 19 to roll in a left hand direction along grooves 47 from the Fig. 4 position to the Fig. 5 position. This rolling movement of the balls along the grooves (with corresponding rolling movement of the balls along surface 39) allows retraction of parts 45 and 46 axially inwardly relative to section 17, so that the spacing between surfaces 39 and 67 can reduce to the distance represented at "b" in Fig. 5. This axial retraction of parts 45 and 46 releases the previously very tight frictional engagement between part 46 and the end of insert 11, so that this frictional engagement will not tend to unscrew the insert from bore 12. The left hand rotation of chuck 27 and shank 20 is continued until the threaded end 31 of shank 21 is completely unscrewed from the insert. Spring 62 of course always returns retainer 60 and the controlled balls 19 to the Fig. 4 position, as soon as the connection between the tool and the insert is loosened by initial unscrewing rotation of the tool, so that the balls are always automatically prepared for the next subsequent use of the tool.

Fig. 7 shows fragmentarily a second form of the invention, which may be considered to be identical with that of Figs. 1 through 6 except that it has been adapted for installing a stud 11a rather than the insert 11 into a carrier part 13a. This stud 11a may have a lower enlarged diameter portion 70 which is externally threaded the same as insert 11 of the first form of the invention, and which has recesses 71 rendering the threads self-tapping. The enlarged portion 70 of the stud carries a reduced diameter upwardly projecting portion 72, which is externally threaded at 73, and to which a nut or other element is to be attached in order to connect that other element to part 13a by means of the stud 11a.

In order to adapt the tool for installing such a stud, instead of an insert, the insert carrying shank 21 of the first form of the invention is deleted, and the part 20a, corresponding to the part 20 of Figs. 1 to 6, is internally threaded at 74 to receive the threaded end 73 of the stud. Part 46a, corresponding to part 46 of the first form of the invention, bears against a transverse shoulder 53a formed on the stud, and corresponding to the end surface 53 of the insert in Fig. 2.

The tool of Fig. 7 is used in essentially the same manner as that of Figs. 1 to 6. That is, the stud 11a is screwed into bore 74, until shoulder 53a engages against part 46a. A chuck such as that shown at 27 in Fig. 1 is then actuated to turn the tool in the manner previously discussed, and in a right hand direction, to screw the enlarged threaded portion 70 of the stud into an initially unthreaded bore in part 13a. After the stud has been completely installed, the driving shank of the tool is turned in a left hand unscrewing direction, and the initial portion of that unscrewing movement releases part 46a for axial retraction, so that the tight frictional connection between the stud and the tool is released, and part 20a can therefore be unscrewed from the threaded portion 73 of the stud. The action of the balls, etc., is identical in both forms of the invention.

I claim:

1. A tool for screwing a threaded element into a bore, comprising a first section adapted to be turned about a predetermined axis, a work-holding structure mounted to turn with said first section and having threads for engaging and holding said element, a second section adapted to turn with and relative to said first section about said axis, means forming a shoulder positioned to be pressed axially inwardly against said element by said second section, a plurality of circularly spaced shiftable rolling members for transmitting axially inward forces from said first section to the second as said element is screwed into said bore, each of said rolling members being engageable with two opposed surfaces on said two sections respectively and being adapted to roll along said surfaces upon rotary movement of the first section relative to the second in an unscrewing direction, one of said surfaces being inclined with respect to the other in a direction to release said second section for slight axial retraction relative to the first section as said members roll along said surfaces upon said unscrewing rotary movement of the first section, and means yieldingly urging said rolling members circularly relative to one of said sections in a direction the reverse of the direction in which the members roll relative to that section upon said unscrewing rotary movement of the first section relative to the second.

2. A tool for screwing a threaded element into a bore, comprising a first section adapted to be turned about a predetermined axis, a work-holding structure mounted to turn with said first section and having threads for engaging and holding said element, a second section adapted to turn with and relative to said first section about said axis, means forming a shoulder positioned to be pressed axially inwardly against said element by said second section, a plurality of circularly spaced shiftable rolling members for transmitting axially inward forces from said first section to the second as said element is screwed into said bore, each of said rolling members being engageable with two opposed surfaces on said two sections respectively and being adapted to roll along said surfaces upon rotary movement of the first section relative to the second in an unscrewing direction, one of said surfaces being inclined with respect to the other in a direction to release said second section for slight axial retraction relative to the first section as said members roll along said surfaces upon said unscrewing rotary movement of the first section, a retainer for positioning said rolling members and mounted for rotary movement relative to both of said sections, and a spring yieldingly urging said retainer and thereby said rolling members circularly relative to one of said sections in a rotary direction the reverse of that in which the members roll relative to said one section upon said unscrewing relative rotary movement of the sections.

3. A tool as recited in claim 2, in which said retainer is located axially between said two sections.

4. A tool for screwing a threaded insert into a bore, comprising a first section adapted to be turned about a predetermined axis, a shank projecting axially from and turning with said first section and having external threads to be screwed into the insert, a second section extending about said shank and adapted to turn with and relative to said first section about said axis, said second section having a shoulder about said shank positioned to abut axially inwardly against an insert carried on the shank, a series of circularly spaced rolling members interposed between said two sections at locations spaced about said axis for transmitting axial forces therebetween, each of said rolling members being engaged with two opposed surfaces on said two sections respectively and being adapted to roll along said surfaces upon rotary movement of the first section relative to the second in an unscrewing direction, one of said surfaces being inclined with respect to the other in a direction to release said second section for slight axial retraction relative to the first section as said members roll along said surfaces upon said unscrewing rotary movement of the first section, a retainer plate axially between said sections containing apertures within which said rolling members are retained, and a spring yieldingly urging said retainer circularly relative to the section which has said inclined surface and in a rotary direction the reverse of that in which said members roll relative to said inclined surface upon said unscrewing rotation of said first section.

5. A tool as recited in claim 4, in which said first section is free for rotation in said unscrewing direction relative to said second section through a full 360 circular degrees and beyond, said other surface being shaped to advance circularly through a full 360 circular degrees without axial advancement to avoid interference with said 360 degree unscrewing rotatability of the first section relative to the second section.

6. A tool as recited in claim 1, in which said rolling members are spherical balls partially received within individual axially facing essentially arcuate grooves which are formed in one of said sections and confine said balls against radially inward and outward movement.

7. A tool as recited in claim 1, in which said work holding structure is an externally threaded shank projecting from said first section and connectable into internal threads in said element.

8. A tool as recited in claim 1, including a snap ring retaining said sections against axial separation one from the other.

9. A tool for screwing a threaded element into a bore, comprising a first section adapted to be turned about a predetermined axis and having a flange projecting radially outwardly, a shank projecting axially from the turning with said flange of the first section and having a threaded portion for threadedly engaging and holding said element, a wall carried by said flange and projecting axially from the periphery thereof and extending about said axis at a location spaced radially outwardly from said shank to form an essentially annular cavity about the shank and enclosed by said wall, a second section extending about said shank and confined within said cavity and adapted to turn with and relative to said first section about said axis, said second section having a shoulder extending about said axis and positioned to abut axially inwardly against an element carried on the shank, a series of circularly spaced rolling members interposed axially between said flange and said second section at locations spaced about said axis for transmitting axial forces therebetween, each of said rolling members being engaged with two axially opposed surfaces on said flange and said second section respectively and being adapted to roll along said surfaces upon rotary movement of the first section relative to the second in an unscrewing direction, one of said surfaces being inclined with respect to the other in a direction to release said second section for slight axial retraction relative to the first section as said members roll along said surfaces upon said unscrewing rotary movement of the first section, and means retaining said second section against removal axially from said cavity.

10. A tool for screwing a threaded element into a bore, comprising a first section adapted to be turned about a predetermined axis and having a flange projecting radially outwardly, a shank projecting axially from and turning with said flange of the first section and having a threaded portion for threadedly engaging and holding said element, a wall carried by said flange and projecting axially from the periphery thereof and extending about said axis at a location spaced radially outwardly from said shank to form an essentially annular cavity about the shank and enclosed by said wall, a second section extending about said shank and confined within said cavity and adapted to turn with and relative to said first section about said axis, said second section having a shoulder extending about said axis and positioned to abut axially inwardly against an element carried on the shank, a series of circularly spaced rolling members interposed axially between said flange and said second section at locations spaced about said axis for transmitting axial forces therebetween, each of said rolling members being engaged with two axially opposed surfaces on said flange and said second section respectively and being adapted to roll along said surfaces upon rotary movement of the first section relative to the second in an unscrewing direction, one of said surfaces being inclined with respect to the other in a direction to release said second section for slight axial retraction relative to the first section as said members roll along said surfaces upon said unscrewing rotary movement of the first section, and a snap ring engaged in a groove in the inner surface of said axially extending wall and retaining said second section against removal axially inwardly from said cavity.

11. A tool as recited in claim 10, in which said rolling members are spherical balls received and confined within individual arcuate recesses in said second section, there being a retainer plate axially between said flange and said second section containing apertures within which said balls are confined, and a spring yieldingly urging said retainer plate circularly relative to said second section in said unscrewing rotary direction.

References Cited in the file of this patent

UNITED STATES PATENTS

| 1,125,186 | Schneider | Jan. 19, 1915 |
| 1,308,490 | Funk | July 1, 1919 |
| 1,384,417 | Weichhart | July 12, 1921 |
| 1,463,497 | Bugatti | July 31, 1923 |
| 2,641,948 | Braendel | June 16, 1953 |
| 2,694,328 | La Freniere | Nov. 16, 1954 |
| 2,704,473 | Walther | Mar. 22, 1955 |

FOREIGN PATENTS

| 191,960 | Great Britain | Jan. 25, 1923 |